(12) United States Patent
Backulja

(10) Patent No.: US 11,518,439 B2
(45) Date of Patent: Dec. 6, 2022

(54) SYSTEM FOR SECURING A PIVOTING BOLT TO A VEHICLE FRAME, VEHICLE FRAME FOR CONNECTING A PIVOTING BOLT AND METHOD FOR MOUNTING A PIVOTING BOLT TO A VEHICLE FRAME

(71) Applicant: SAF-HOLLAND GmbH, Bessenbach (DE)

(72) Inventor: Dusan Backulja, Aschaffenburg (DE)

(73) Assignee: SAF-HOLLAND GmbH, Bessenbach (DE)

( * ) Notice: Subject to any disclaimer, the term of this patent is extended or adjusted under 35 U.S.C. 154(b) by 41 days.

(21) Appl. No.: 16/628,569

(22) PCT Filed: Jul. 4, 2018

(86) PCT No.: PCT/EP2018/068076
§ 371 (c)(1),
(2) Date: Jan. 3, 2020

(87) PCT Pub. No.: WO2019/008024
PCT Pub. Date: Jan. 10, 2019

(65) Prior Publication Data
US 2020/0216116 A1    Jul. 9, 2020

(30) Foreign Application Priority Data

Jul. 7, 2017   (DE) .......................... 10 2017 115 248

(51) Int. Cl.
*B62D 21/11*   (2006.01)
*B60G 7/02*    (2006.01)
(Continued)

(52) U.S. Cl.
CPC ................ *B62D 21/11* (2013.01); *B60G 7/02* (2013.01); *F16B 19/02* (2013.01); *F16B 33/002* (2013.01);
(Continued)

(58) Field of Classification Search
CPC .......... B62D 21/11; B62D 21/03; B60G 7/02; B60G 2204/143; B60G 2206/91;
(Continued)

(56) References Cited

U.S. PATENT DOCUMENTS 3,333,866 A * 8/1967 Cuskie ................... B60G 9/006
                                                280/124.116
3,521,845 A * 7/1970 Sweda ................. B61D 45/007
                                                      410/83

(Continued)

FOREIGN PATENT DOCUMENTS

DE           4115110 A1    8/1991
DE     102011084198 A1    4/2013
(Continued)

OTHER PUBLICATIONS

European Patent Office; International Search Report; dated Sep. 11, 2018.

*Primary Examiner* — Darlene P Condra
(74) *Attorney, Agent, or Firm* — Price Heneveld LLP

(57) ABSTRACT

A system for securing a pivoting bolt to a vehicle frame, on which, in a mounted state, a link element, is mounted pivotably, including a sleeve element for receiving the pivoting bolt, wherein a collar region is provided or formed on the sleeve element, wherein the collar region is configured in such a manner that, in a mounted state, the collar region interacts in a form-fitting manner with a vehicle-frame-side engagement region, including a protrusion or an indentation, in order to avoid twisting of the sleeve element.

24 Claims, 2 Drawing Sheets

Figure 1:
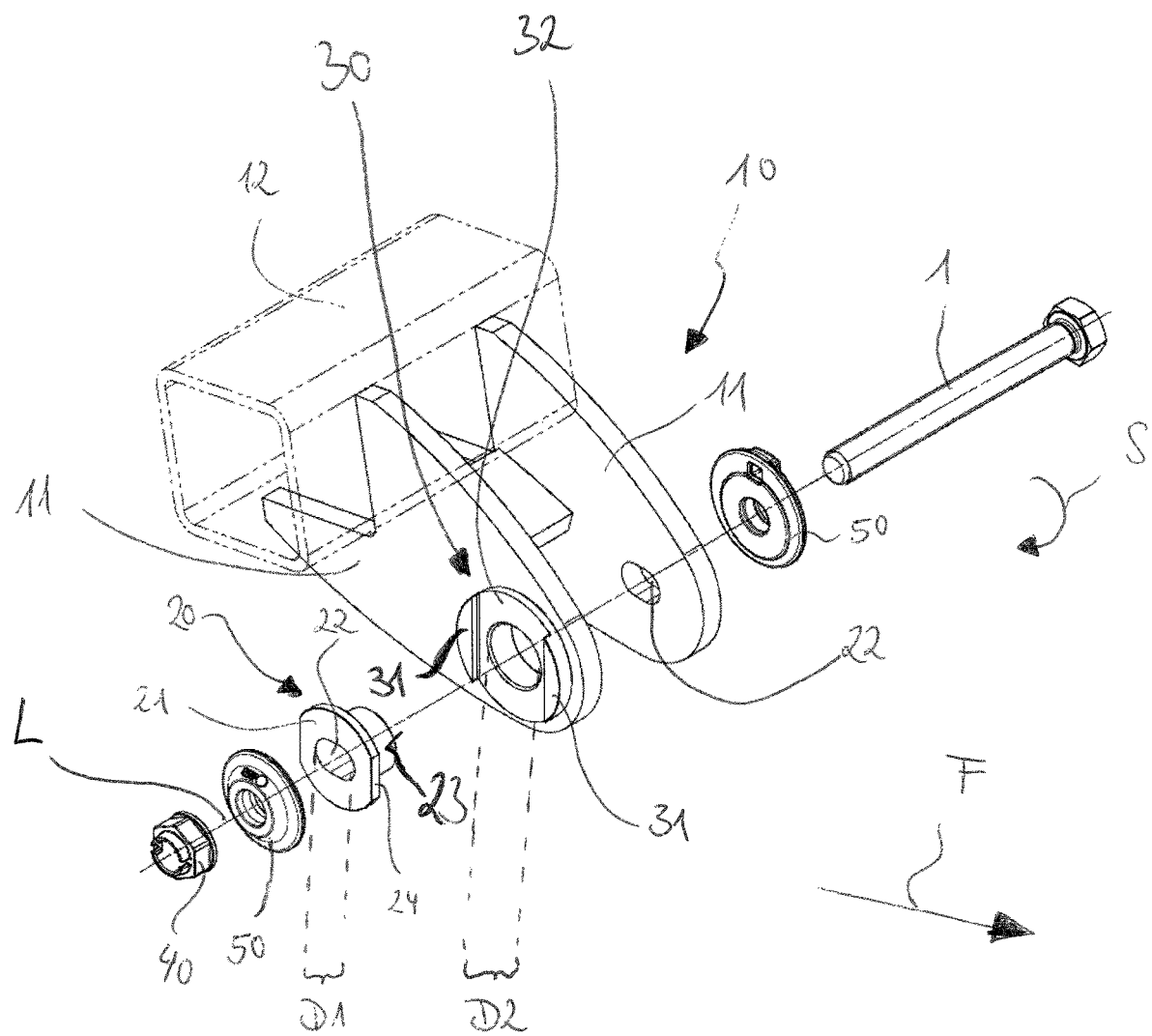

(51) Int. Cl.
*F16B 19/02* (2006.01)
*F16B 33/00* (2006.01)
*F16C 11/04* (2006.01)
*F16C 17/02* (2006.01)
*B62D 21/03* (2006.01)
*F16B 43/00* (2006.01)

(52) U.S. Cl.
CPC .............. *F16C 11/04* (2013.01); *F16C 17/02* (2013.01); *B60G 2204/143* (2013.01); *B62D 21/03* (2013.01); *F16B 43/00* (2013.01); *F16C 2226/76* (2013.01)

(58) Field of Classification Search
CPC ........ F16B 19/02; F16B 33/002; F16B 43/00; F16C 11/04; F16C 17/02; F16C 2226/76; F16C 2361/31; F16C 11/045
See application file for complete search history.

(56) References Cited

U.S. PATENT DOCUMENTS

| | | | |
|---|---|---|---|
| 3,880,444 A | 4/1975 | Bridges | |
| 4,000,914 A * | 1/1977 | Wragg | B60G 11/22 |
| | | | 280/682 |
| 4,266,661 A * | 5/1981 | Andersson | B65G 17/08 |
| | | | 198/822 |
| 4,675,940 A * | 6/1987 | Brockhaus | E05D 5/127 |
| | | | 16/254 |
| 5,288,191 A | 2/1994 | Ruckert et al. | |
| 5,775,719 A * | 7/1998 | Holden | B60G 7/02 |
| | | | 280/86.75 |
| 6,550,795 B1 | 4/2003 | Schlosser et al. | |
| 6,688,617 B2 | 2/2004 | Chamberlin | |
| 7,857,565 B2 * | 12/2010 | Martinson | F16B 43/00 |
| | | | 411/136 |
| 8,230,707 B2 * | 7/2012 | Hung | E05B 73/0082 |
| | | | 70/58 |
| 8,307,514 B2 * | 11/2012 | Clark, Sr. | E05D 11/00 |
| | | | 16/386 |
| 8,544,558 B1 * | 10/2013 | Seal | E02F 9/024 |
| | | | 172/799.5 |
| 9,011,057 B2 * | 4/2015 | Asakura | F16B 19/1063 |
| | | | 411/34 |
| 9,096,110 B1 * | 8/2015 | Bandy | B60G 7/02 |
| 10,766,326 B2 * | 9/2020 | Hata | B60G 7/008 |
| 2002/0063005 A1 * | 5/2002 | Klais | B60G 7/02 |
| | | | 180/167 |
| 2003/0019259 A1 | 1/2003 | Nicodemus et al. | |
| 2005/0084261 A1 * | 4/2005 | Takahashi | G03B 9/36 |
| | | | 396/464 |
| 2005/0084361 A1 * | 4/2005 | Fly | F16B 5/0642 |
| | | | 411/107 |
| 2005/0156398 A1 * | 7/2005 | Ramsey | B60G 9/003 |
| | | | 280/124.116 |
| 2008/0036167 A1 * | 2/2008 | Svartz | B60G 7/006 |
| | | | 280/124.116 |
| 2010/0186546 A1 * | 7/2010 | Kaijala | G05G 1/506 |
| | | | 74/560 |
| 2013/0042464 A1 * | 2/2013 | Orcutt | B60G 7/001 |
| | | | 29/525.11 |
| 2015/0043990 A1 * | 2/2015 | Endres | F16B 5/02 |
| | | | 411/337 |
| 2016/0123366 A1 * | 5/2016 | Shiotani | F16B 5/0642 |
| | | | 411/509 |
| 2016/0290391 A1 | 10/2016 | Hill et al. | |
| 2019/0353196 A1 * | 11/2019 | Schmidt | F16B 5/025 |

FOREIGN PATENT DOCUMENTS

DE   102012201745 A1   8/2013
GB   2257670 A   1/1993

* cited by examiner

US 11,518,439 B2

SYSTEM FOR SECURING A PIVOTING BOLT TO A VEHICLE FRAME, VEHICLE FRAME FOR CONNECTING A PIVOTING BOLT AND METHOD FOR MOUNTING A PIVOTING BOLT TO A VEHICLE FRAME

BACKGROUND OF THE INVENTION

The present invention relates to a system for securing a pivoting bolt to a vehicle frame, to a vehicle frame for connecting a pivoting bolt, and to a method for mounting a pivoting bolt to a vehicle frame.

Link elements, in particular longitudinal links, are well known from the prior art and serve for connecting a vehicle axle to a vehicle chassis. For this purpose, the link elements are mounted on a vehicle frame so as to be pivotable about a pivot axis. Said vehicle frame typically comprises two side walls which run substantially parallel to each other and between which, in the mounted state, the pivoting bolt runs, while the link element is coupled pivotably to the pivoting bolt between the side walls. A clamping mechanism is conventionally provided here which secures the pivoting bolt in relation to the vehicle frame in such a manner that rotational movements or displacements of the pivoting bolt can be avoided.

However, it is possible that the side walls do not run parallel to each other and therefore the conventionally used clamping mechanism cannot be inserted between the side walls. However, during pivoting movements of the link element in such cases without the clamping mechanism, noise may be produced by the pivoting bolt.

It is therefore an object of the present invention to provide a system which can be used as universally as possible and with which the pivoting bolt can be secured in relation to the vehicle frame, in particular in respect of displacements and twistings in relation to the vehicle frame.

SUMMARY OF THE INVENTION

According to the invention, a system is provided for securing a pivoting bolt to a vehicle frame, on which, in a mounted state, a link element, in particular of a utility vehicle, is mounted pivotably, comprising a sleeve element for receiving the pivoting bolt, wherein a collar region is provided or formed on the sleeve element, wherein the collar region is configured in such a manner that, in a mounted state, the collar region interacts in a form-fitting manner with a vehicle-frame-side engagement region, in particular a protrusion or an indentation, in order to avoid twisting of the sleeve element. In contrast to the prior art, it is possible in an advantageous manner to dispense with a clamping mechanism by means of the system according to the invention. That is to say, such a system can also be used on vehicle frames in which a clamping mechanism cannot be realized for securing the pivoting bolt. The vehicle frame preferably comprises two side walls between which the pivoting bolt runs transversely, i.e. perpendicularly to the direction of travel, for the mounting of the link element, in particular a longitudinal link. By means of the sleeve element, in particular the sleeve-element-side collar region, it is advantageously possible to secure the pivoting bolt against a rotational movement. For this purpose, in the mounted state, the pivoting bolt is preferably connected to the sleeve element for rotation therewith, for example in a form-fitting and/or force-fitting manner. The sleeve-element-side collar region preferably interacts along a direction predetermined by a pivoting direction with the vehicle-frame-side protrusion in order to prevent the sleeve element and therefore the pivoting bolt from rotating during operation. A pivoting direction is preferably understood as meaning the direction of rotation along which a pivoting movement of the link element also takes place during operation. For this purpose, it is advantageously provided to configure the sleeve-element-side collar region in a complementary manner with respect to the vehicle-frame-side engagement region, in particular a protrusion or indentation. The vehicle-frame-side engagement region, in particular the protrusion or indentation, and the sleeve-element-side collar region are preferably configured in such a manner that they interact with each other in a form-fitting manner in the pivoting direction and counter to the pivoting direction, i.e. independently of the direction of rotation. In order to provide a sufficiently large form-fitting surface along which the sleeve-element-side collar region and the vehicle-frame-side engagement region interact with each other, the vehicle-frame-side engagement region protrudes from or into an upper side of the vehicle frame, in particular of the side wall, with a protrusion height or indentation depth. In particular, a ratio between a thickness of the sleeve-shaped collar element, as measured parallel to the longitudinal direction of the pivoting bolt in the mounted state, and the protrusion height or indentation depth assumes a value of between 0.2 and 1.2, preferably of between 0.5 and 0.95 and particularly preferably of between 0.75 and 0.93. As a result, the sleeve-element-side collar region, in particular for a ratio of between 0.75 and 0.93, can preferably be arranged offset in relation to the protrusion, as seen in the longitudinal direction of the pivoting bolt, and therefore protected, and at the same time can provide as large a form-fitting surface as possible. Furthermore, it is preferably provided that the pivoting bolt is configured in a cylindrical or rod-shaped manner, in particular in a threaded region of the pivoting bolt. The pivoting bolt preferably comprises a pivoting bolt head with which the pivoting bolt, in the mounted state, lies against a side wall of the vehicle frame, and a thread at an end of the pivoting bolt opposite the pivoting bolt head. In the mounted state, the pivoting bolt reaches through the vehicle frame, i.e. through the two side walls of the vehicle frame. In particular, the side walls are mounted, in particular connected in an integrally bonded manner, for example welded, on a crossmember of the vehicle frame. Furthermore, it is conceivable for the sleeve element and the collar region to be formed integrally, i.e. as a single piece. Furthermore, it is preferably provided that the vehicle-element-side engagement region, in particular protrusion or indentation, is arranged in or on the vehicle frame in the region of a recess through which the pivoting bolt reaches in the mounted state. In particular, a ratio between a smallest distance of the vehicle-element-side protrusion from the recess and the diameter of the recess assumes a value of between 0.05 and 0.6, preferably of between 0.1 and 0.5 and particularly preferably of between 0.2 and 0.4. It is furthermore conceivable that the vehicle-frame-side engagement region, in particular the protrusion or indentation, is an integral part of one of the side walls.

It is advantageously provided that the sleeve element for receiving the pivoting bolt has an elongated hole, in particular an elongated hole with an oval shape. The elongated hole advantageously simplifies mounting since it permits the pivoting bolt to be oriented before the pivoting bolt is secured. The pivoting bolt can thereby be oriented in particular in such a manner that it runs perpendicularly to a direction of travel. The elongated hole is preferably dimensioned in such a manner that the pivoting bolt can be displaced only in one direction. By limiting the degrees of freedom for the movement of the pivoting bolt, the mounting is simplified further. For this purpose, a slot width of the elongated hole substantially corresponds to an outside diameter of that part of the pivoting bolt which is mounted in the elongated hole.

It is expediently provided that, in the mounted state, the elongated hole extends along a direction running parallel to a driving direction or perpendicularly to a direction of travel. An orientation of the sleeve element and therefore of the elongated hole is fixed here in particular by the form-fitting connection to the vehicle-frame-side engagement region, in particular protrusion or indentation. By means of an elongated hole running parallel to the direction of travel, an offset in the driving direction for orienting the pivoting bolt can advantageously take place, as can height adaptation, with an offset running perpendicularly to the direction of travel. It is conceivable here for the orientation of the elongated hole in the sleeve element to be fixed by an elongated hole in the side wall which, in the mounted state, is opposite the sleeve element. For example, the elongated holes in the side wall and in the sleeve element are oriented parallel to one another or perpendicularly to one another.

It is expediently provided that the sleeve element has a cylindrical outer lateral surface for the precisely fitting admission of the sleeve element into a recess of the vehicle frame. The sleeve element can thereby be pushed into the vehicle-frame-side recess along a direction predetermined by a longitudinal direction of the pivoting bolt. In particular, the sleeve element can be twisted during the mounting until the collar region can be pushed into the recess in the sense of a lock and key principle and, in the pushed-in state, interacts in a form-fitting manner with the engagement region or the engagement regions, in particular protrusions or indentations. In the mounted state, the outer lateral surface preferably extends along the entire recess in the side wall, as seen in the longitudinal direction of the pivoting bolt, in order to avoid deposition of impurities and to provide as large a supporting surface as possible for the pivoting bolt. Precisely fitting should be understood as meaning in particular that an inside diameter of the recesses substantially corresponds to the outside diameter of the sleeve element, and therefore the sleeve element can be arranged in the recess of the vehicle frame without play or without forming a gap. The sleeve element is preferably dimensioned in such a manner that the sleeve element can be pressed in the recess. A press fit can therefore be provided.

It is preferably provided that the collar region has a section in the form of a chord of a circle for forming form-fitting surfaces which, in the mounted state, interact in the pivoting direction in a form-fitting manner with the vehicle-frame-side protrusion. Such form-fitting surfaces can be produced comparatively simply since only part of the otherwise circular circumference of the collar region has to be separated. In the mounted state, the section in the form of a chord of a circle lies against the protrusion. It is conceivable here for the collar region to be hardened, in particular in the chord section, in order to meet the loadings occurring on the form-fitting surfaces in operation. It is particularly preferred if the section in the form of a chord of a circle is formed in a complementary manner with respect to at least parts of the vehicle-side engagement section.

It is expediently provided that a ratio between the section in the form of a chord of a circle to an overall extent of the collar region, as measured along the pivoting direction, assumes a value of between 0.2 to 0.8, preferably 0.35 to 0.65 and particularly preferably 0.38 to 0.52. It has advantageously turned out that, with a dimensioning of between 0.35 and 0.65, a length can be provided for the section which is in the shape of a chord of a circle, with which length twisting of the sleeve element in a manner independent of the direction of rotation can be suppressed in the mounted state by the form-fitting interaction with the protrusion. In addition, for a dimensioning of between 0.38 to 0.52, a sufficiently stable collar region is advantageously provided.

It is preferably provided that the sleeve-element-side collar region has protrusions which protrude in the longitudinal direction of the pivoting bolt and, in the mounted state, interact in the pivoting direction in a form-fitting manner with part of the pivoting bolt, preferably a pivoting bolt head, in particular a screw head. It is advantageously possible by means of the protrusions protruding in the longitudinal direction (of the pivoting bolt) to obtain a rotationally fixed connection between the pivoting bolt and the sleeve element. The protrusions protruding in the longitudinal direction particularly preferably interact in a form-fitting manner in the pivoting direction with a screw head, i.e. the pivoting bolt is introduced into the vehicle frame on the side of the sleeve element and placed in such a manner that the pivoting bolt head or the screw head interacts in a form-fitting manner with the protrusions. The pivoting bolt is subsequently secured by means of a nut which is screwed onto the pivoting bolt on that side wall of the vehicle frame which is opposite the sleeve element.

It is preferably provided that the system has an adapter element which is configured in such a manner that, in the mounted state, the adapter element provides the vehicle-frame-side engagement region, in particular protrusion or indentation. As a result, the vehicle-frame-side engagement region, in particular protrusion or indentation, can be realized on a vehicle frame in as simple a manner as possible. That is to say, the system can advantageously be used for vehicle frames which have only one recess, for example a hole, in their side wall. It is conceivable here that, for the mounting of the adapter element, the side wall is drilled out further and then the adapter element is pushed into the side wall. Furthermore, the adapter element is preferably configured for connecting to the vehicle frame in a form-fitting, force-fitting and/or integrally bonded manner. For example, the adapter element comprises structures, such as corrugations or surface roughening, which assist formation of a form-fitting or force-fitting connection between the adapter element and the vehicle frame. The adapter element placed in the side wall is preferably welded to the side wall. For this purpose the adapter element comprises, for example, an adapter-element-side collar region which provides as large a surface as possible for an integrally bonded connection.

It is advantageously provided that in the mounted state, the adapter element provides a vehicle-frame-side recess of the vehicle frame, wherein the recess has a diameter, wherein a ratio of a length of the elongated hole in the sleeve element to the diameter of the recess assumes a value of between 0.3 and 0.9, preferably of between 0.5 and 0.9 and particularly preferably of between 0.75 and 0.88. At a ratio of between 0.75 and 0.88, a particularly long elongated hole is advantageously provided which permits a corresponding freedom of movement during the mounting of the pivoting bolt. For the ratios of between 0.5 and 0.9, the dimensioning ensures that the collar region or the sleeve element withstands the anticipated loadings.

It is expediently provided that the adapter element has a circular segment as the vehicle-frame-side protrusion, wherein preferably a plurality of circular segments are provided, the chords of which are oriented parallel to one another and face one another. As a result, a groove-shaped channel can be provided between the vehicle-frame-side protrusions, in which channel the sleeve-element-side collar region is arranged in the mounted state. It is preferably provided that the adapter element is oriented before the integrally bonded connection to the side wall or to the vehicle frame in such a manner that the chords run substantially perpendicular to the direction of travel. In particular, the chords of the circular segments of the adapter element are configured in a complementary manner to those sections of the sleeve element which are in the form of a chord of a circle.

It is preferably provided that the sleeve element can be clamped to the pivoting bolt, preferably by means of a counterpart element, such as, for example, a nut, and/or the sleeve element is configured to clamp a bushing arranged between side walls of the vehicle frame. The sleeve element can thereby be advantageously connected to the pivoting bolt for rotation therewith. The counterpart element is preferably pulled onto a pivoting-bolt-side thread and tightened until the sleeve element is clamped to the vehicle frame, in particular to the side wall. A washer element is preferably provided which, in the mounted state, can be arranged between the counterpart element and the sleeve element. The washer element is preferably configured here in such a manner that a uniform force acts on a collar surface of the collar region, as seen in the longitudinal direction of the pivoting bolt. It is furthermore conceivable for the washer element to be dimensioned in such a manner that the washer element covers the collar region and the vehicle-frame-side protrusions and thereby advantageously prevents deposition of impurities and provides protection for the collar regions of the adapter element and of the sleeve element. If the sleeve element clamps a bushing arranged between the side walls of the vehicle frame, it is provided that, in the mounted state, the sleeve element reaches or protrudes through a first of the side walls and protrudes in relation to the side wall. The bushing can thereby be advantageously clamped between the other of the side walls and the sleeve element in such a manner that, during a pivoting movement of the link element, the bushing and the sleeve element cannot be pivoted or twisted at the same time. In particular, it is provided that the link element is connected to the bushing.

It is expediently provided that the system has an insert with an insert-side elongated hole. As a result, an elongated hole can advantageously likewise be provided in the side wall which, in the mounted state, lies opposite the side wall with the sleeve element, as a result of which the mounting can be further simplified in an advantageous manner. In particular, it is provided here that the insert is admitted into a recess, preferably a circular recess, and is subsequently welded to the side wall. It is conceivable here for the recess in the side wall to be initially expanded in order to permit the insert to be pushed in.

It is expediently provided that the adapter element and the sleeve element are configured in such a manner that they end flush with each other, as seen in the pivoting direction. It is particularly preferably provided that the collar region and the protrusion are configured in such a manner that they end flush, in particular outward, at their circumference. This makes it possible to avoid deposition of impurities and the formation of protrusions which constitute a risk of injury. The sleeve-shaped collar region and the vehicle-frame-side protrusion, preferably on the adapter element, are advantageously configured in such a manner that they provide a closed circumference.

The present invention furthermore relates to a vehicle frame for connecting a pivoting bolt about which a link element is pivotable in a mounted state, wherein the vehicle frame has opposite side walls, wherein the side walls each have a recess, said recess being aligned with each other, wherein the vehicle frame has at least one vehicle-frame-side engagement region protruding from one of the side walls, in particular a protrusion or an indentation, for forming an abutment for a sleeve element with a collar region. All the features described for the system according to the invention and the advantages of said features can be expediently also transferred to the vehicle frame according to the invention, and vice versa.

According to a further embodiment of the present invention, it is provided that the recess in at least one of the side walls is an elongated hole. The mounting of the pivoting bolt can be simplified further by means of the elongated hole.

A further aspect of the present invention is a method for mounting a pivoting bolt to a vehicle frame:
providing the vehicle frame, the pivoting bolt and a sleeve element, wherein a collar region is configured on the sleeve element in such a manner that, in a mounted state, the collar region interacts in a form-fitting manner with a vehicle-frame-side engagement region, in particular protrusion or indentation, in order to avoid twisting of the sleeve element or sleeve body,
fitting the sleeve element into a recess of the vehicle frame,
fitting the pivoting bolt into the sleeve element and
connecting the sleeve element to the pivoting bolt.

All of the features described of the system according to the invention and the advantages of said features can expediently also be transferred to the method according to the invention, and vice versa. In particular, the sleeve element is connected to the pivoting bolt in such a manner that the pivoting bolt and the sleeve element are rotationally fixed with respect to each other.

BRIEF DESCRIPTIONS OF THE DRAWINGS

Further advantages and features emerge from the description below of preferred embodiments of the subject matter of the invention with regard to the attached figures. Individual features of the individual embodiments can be combined with one another here within the scope of the invention. In the figures FIG. 1 shows a system for securing a pivoting bolt according to a first preferred embodiment of the present invention; and FIG. 2 shows a system for securing a pivoting bolt according to a second preferred embodiment of the present invention.

DETAILED DESCRIPTION OF THE PREFERRED EMBODIMENT

Figure 2:
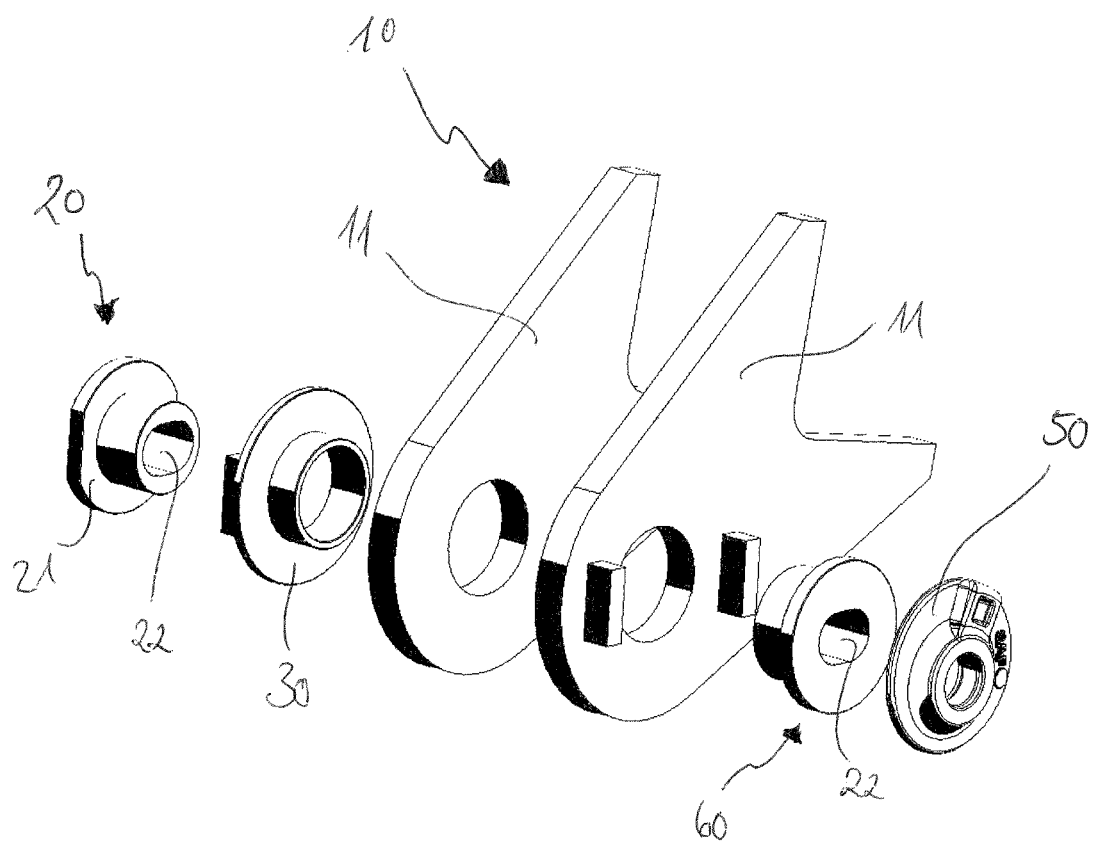

FIG. 1 illustrates a system for securing a pivoting bolt 1 according to a preferred embodiment of the present invention. This particularly involves a pivoting bolt 1 via which a link element of a utility vehicle is connected pivotably to the vehicle chassis. The pivoting bolt 1 is preferably connected pivotably here to a vehicle frame 10, wherein the vehicle frame 10 comprises two opposite side walls 11. In the mounted state, the link element (not illustrated) is mounted between the side walls 11. For this purpose, the pivoting bolt 1 is arranged in mutually aligned recesses in the side walls 11, as a result of which the two side walls 11 are connected to each other via the pivoting bolt 1 running transversely with respect to the direction of travel F. It is furthermore conceivable here for the two side walls 11 to be connected to a common crossmember 12. Depending on the configuration of the vehicle chassis, it may be required that the side walls 11 are welded to the crossmember 12, and that, as a result of said welding operation, the side walls 11 do not run parallel to each other. This makes it impossible to use clamping mechanisms which are otherwise used for securing the pivoting bolt 1. In order nevertheless to sufficiently secure the pivoting bolt 1 in the mounted state in order thereby to avoid undesirable noises during the pivoting of the link element in the pivoting direction S, the system for securing the pivoting bolt 1 comprises a sleeve element 20 which has a collar region 21 on its end side. In particular, the collar region 21 protrudes perpendicularly from an outer lateral surface 23 of the sleeve element 20. The outer lateral surface 23 is advantageously dimensioned in such a manner that the sleeve element 20 can be pushed in a substantially precisely fitting manner into the recess in the vehicle frame 10, in particular into one of the side walls 11, until the collar region 21 strikes against the vehicle frame 10. The recess is preferably provided in the vehicle frame 10 by means of an adapter element 30. Such an adapter element 30 comprises, for example, a sleeve-shaped basic body which provides the recess of the vehicle frame 10. The adapter element 30 is preferably connected in an integrally bonded manner, particularly preferably welded, to the side wall 11. Furthermore, an adapter-element-side collar region 32 is provided which, in the mounted state, lies against one of the side walls 11, in particular on a side of the side wall 11 facing away from the link element. The adapter-element-side collar region 32 is preferably configured in such a manner that it has vehicle-frame-side protrusions 31 which protrude from the side wall and, in particular in the mounted state, protrude from the side wall 11 along a direction predetermined by the longitudinal direction of the pivoting bolt 1. In the exemplary embodiment illustrated, the vehicle-frame-side protrusions 11 are formed as circular segments, the chords of which are oriented parallel to each other and face each other. In a complementary manner with respect to the configurations of the vehicle-frame-side protrusions 31, the sleeve-element-side collar region 21 comprises sections 24 in the form of a chord of a circle. That is to say, two sections 24 which run parallel to each other and are in the form of a chord of a circle are provided along a circumference of the sleeve-element-side collar region 21. It is thereby possible that, in the mounted state, the sleeve-element-side collar region 21 interacts along the pivoting direction S in a form-fitting manner with the vehicle-frame-side protrusions 31.

It can thereby be prevented that the sleeve element 20 can twist along the pivoting direction S in the mounted state. As soon as the pivoting bolt 1 is connected to the sleeve element 20 for rotation therewith, the pivoting bolt 1 can thereby advantageously be secured in a rotationally fixed manner to the vehicle frame 10.

In order to simplify a mounting of the pivoting bolt 1, an elongated hole 22 is preferably provided which is integrated in the sleeve element 20 and/or in a side wall 11 lying opposite the sleeve element 20 in the mounted state. The pivoting bolt 1 can thereby be introduced comparatively simply and rapidly into the recesses provided in the sleeve element 20 and/or in the side wall 11 which, in the mounted state, lies opposite the sleeve element 20. It is preferably provided that, in the mounted state, the adapter element 30 provides the recess of the vehicle frame 10, wherein the recess has a diameter D2, wherein a ratio of a length D1 of the elongated hole 22 in the sleeve element 20 to the diameter D2 of the recess assumes a value of between 0.3 and 0.9, preferably of between 0.5 and 0.9 and particularly preferably of between 0.75 and 0.88. After the pivoting bolt 1 is oriented in the elongated hole or the elongated holes 22, the sleeve element 20 is preferably clamped to the vehicle frame 10, preferably by means of a counterpart element 40. For example, the counterpart element 40 is a nut which can be screwed onto one end of the pivoting bolt 1 and, by means of its offset along a longitudinal direction L of the pivoting bolt 1, clamps the sleeve element 20 between the counterpart element 40 and the vehicle frame 10, in particular the side wall 11. In order to provide as uniform a clamping force as possible which acts on the sleeve element 20, a washer element 50 is preferably provided which, in the mounted state, is arranged between the counterpart element 40 and the sleeve element 20. An outside diameter of the washer 50 is preferably larger than the extent of the adapter element 30 in a direction running perpendicularly to the longitudinal direction L, and therefore, in the mounted state, the washer 50 covers the adapter element 30 and the collar region 21.

FIG. 2 illustrates a system for securing a pivoting bolt 1 according to a second preferred embodiment of the present invention. The embodiment of FIG. 2 substantially corresponds to that from FIG. 1 and differs only to the effect that, in the embodiment in FIG. 2, the system additionally comprises an insert 60. Said insert 60 is configured in such a manner that it can be pushed, preferably can be pushed in a precisely fitting manner, into a circular recess in the side wall 11 which, in the mounted state, lies opposite the sleeve element 20. It is provided here that the insert 60 comprises an insert-side elongated hole 22, and therefore the insert 60 provides the elongated hole 22 which is admitted in the side wall 11 of the vehicle frame 10 in FIG. 1.

REFERENCE SIGNS

1 Pivoting bolt
10 Vehicle frame
11 Side wall
12 Crossmember
20 Sleeve element
21 Collar region
22 Elongated hole
23 Outer lateral surface
24 Section in the form of a chord of a circle
30 Adapter element
31 Vehicle-frame-side protrusion
32 Adapter-element-side collar region
40 Counterpart element
50 Washer element
60 Insert
D1 Length of the elongated hole
D2 Diameter of the recess
F Direction of travel
L Longitudinal direction of the pivoting bolt
S Pivoting direction

The invention claimed is:

1. A system for securing a pivoting bolt to a crossmember of a utility vehicle frame, on which, in a mounted state, a utility vehicle link element is mounted pivotably, comprising:

a sleeve element configured to receive the pivoting bolt, wherein a collar region of the sleeve element is configured such that, in a mounted state, the collar region interacts in a form-fitting manner with a vehicle-frame-side engagement region that includes a protrusion where the vehicle-frame-side engagement region is configured to face a longitudinal utility vehicle frame member extending perpendicular to the crossmember of the utility vehicle frame, in order to avoid twisting of the sleeve element, wherein the sleeve element configured to receive the pivoting bolt includes an oval-shaped elongated hole.

2. The system as claimed in claim 1, wherein the sleeve element has a cylindrical outer lateral surface configured for fitting admission of the sleeve element into a recess of the utility vehicle frame.

3. The system as claimed in claim 2, wherein the collar region has a section in the form of a chord of a circle for forming form-fitting surfaces which, in the mounted state, interact in the pivoting direction in a form-fitting manner with the vehicle-frame-side protrusion.

4. The system as claimed in claim 3, wherein a ratio between the section in the form of a chord of a circle to an overall extent of the collar region, as measured along the pivoting direction is between 0.2 to 0.8.

5. The system as claimed in claim 4, wherein the ratio is between 0.35 to 0.65.

6. The system as claimed in claim 5, wherein the ratio is between 0.38 to 0.52.

7. The system as claimed in claim 4, further comprising:
an adapter element which is configured such, in the mounted state, the adapter element includes the vehicle-frame-side protrusion.

8. The system as claimed in claim 7, wherein, in the mounted state, the adapter element includes a vehicle-frame-side recess of the utility vehicle frame, wherein the recess has a diameter, and wherein a ratio of a length of the elongated hole in the sleeve element to the diameter of the recess is between 0.3 and 0.9.

9. The system as claimed in claim 8, wherein the ratio of the length of the elongated hole in the sleeve element to the diameter of the recess is between 0.5 to 0.9.

10. The system as claimed in claim 9, wherein the ratio of the length of the elongated hole in the sleeve element to the diameter of the recess is between 0.75 to 0.88.

11. The system as claimed in claim 8, wherein the adapter element has a circular segment as the vehicle-frame-side protrusion, and wherein a plurality of the circular segments are provided where the chords of the circular segments are oriented parallel to one another and face one another.

12. The system as claimed in claim 11, wherein the sleeve element is at least one of configured to be clamped to the pivoting bolt by a counterpart element, and/or the sleeve element clamps a bushing arranged between side walls of the utility vehicle frame.

13. The system as claimed in claim 12, wherein the sleeve element is clamped to the pivoting bolt by a nut.

14. The system as claimed in claim 12, wherein the system has an insert with an insert-side elongated hole.

15. The system as claimed in claim 14, wherein the adapter element and the sleeve element are configured such that the adapter element and the sleeve element end flush with each other, as seen in the pivoting direction.

16. The system as claimed in claim 1, wherein the collar region has a section in the form of a chord of a circle for forming form-fitting surfaces which, in the mounted state, interact in the pivoting direction in a form-fitting manner with the vehicle-frame-side protrusion.

17. The system as claimed in claim 16, wherein a ratio between the section in the form of a chord of a circle to an overall extent of the collar region, as measured along the pivoting direction is between 0.2 to 0.8.

18. The system as claimed in claim 1, further comprising:
an adapter element which is configured such, in the mounted state, the adapter element includes the vehicle-frame-side protrusion.

19. The system as claimed in claim 1, wherein, in the mounted state, the adapter element includes a vehicle-frame-side recess of the utility vehicle frame, wherein the recess has a diameter, and wherein a ratio of a length of the elongated hole in the sleeve element to the diameter of the recess is between 0.3 and 0.9.

20. The system as claimed in claim 1, wherein the adapter element has a circular segment as the vehicle-frame-side protrusion, and wherein a plurality of the circular segments are provided where the chords of the circular segments are oriented parallel to one another and face one another.

21. The system as claimed in claim 20, wherein the sleeve element is at least one of configured to be clamped to the pivoting bolt by a counterpart element, and/or the sleeve element clamps a bushing arranged between side walls of the utility vehicle frame.

22. The system as claimed in claim 1, wherein the system has an insert with an insert-side elongated hole.

23. The system as claimed in claim 1, wherein the adapter element and the sleeve element are configured such that the adapter element and the sleeve element end flush with each other, as seen in the pivoting direction.

24. A utility vehicle arrangement comprising the system for securing the pivoting bolt of claim 16, and further comprising the utility vehicle frame including the crossmember configured to extend between the longitudinal vehicle frame member and an opposite longitudinal vehicle frame member.

* * * * *

UNITED STATES PATENT AND TRADEMARK OFFICE
CERTIFICATE OF CORRECTION

PATENT NO. : 11,518,439 B2
APPLICATION NO. : 16/628569
DATED : December 6, 2022
INVENTOR(S) : Backulja It is certified that error appears in the above-identified patent and that said Letters Patent is hereby corrected as shown below:

In the Claims

Column 9, Claim 7, Line 26:
After "such" insert -- that --

Column 10, Claim 18, Line 19:
After "such" insert -- that --

Column 10, Claim 24, Line 45:
"16" should be — 1 —

Signed and Sealed this
Fourth Day of April, 2023

Katherine Kelly Vidal
*Director of the United States Patent and Trademark Office*